(12) United States Patent
Peace et al.

(10) Patent No.: US 11,965,079 B2
(45) Date of Patent: Apr. 23, 2024

(54) LIGNIN COMPOSITES COMPRISING ACTIVATED CARBON FOR ODOR REDUCTION

(71) Applicant: West Fraser Mills Ltd., Vancouver (CA)

(72) Inventors: Edwin Peace, Quesnel (CA); Rod Albers, Quesnel (CA)

(73) Assignee: West Fraser Mills Ltd.

( * ) Notice: Subject to any disclaimer, the term of this patent is extended or adjusted under 35 U.S.C. 154(b) by 0 days.

(21) Appl. No.: 16/090,090

(22) PCT Filed: Mar. 30, 2017

(86) PCT No.: PCT/CA2017/000075
§ 371 (c)(1),
(2) Date: Sep. 28, 2018

(87) PCT Pub. No.: WO2017/165960
PCT Pub. Date: Oct. 5, 2017

(65) Prior Publication Data
US 2019/0112478 A1 Apr. 18, 2019

Related U.S. Application Data

(60) Provisional application No. 62/315,722, filed on Mar. 31, 2016, provisional application No. 62/315,744, (Continued)

(51) Int. Cl.
*C08L 1/02* (2006.01)
*B27N 3/00* (2006.01)
(Continued)

(52) U.S. Cl.
CPC ............... *C08L 1/02* (2013.01); *B27N 3/002* (2013.01); *B29B 9/10* (2013.01); *B29C 43/003* (2013.01);
(Continued)

(58) Field of Classification Search
CPC ....... C08L 97/005; C08L 61/06; B27N 3/002; C08K 3/04
See application file for complete search history.

(56) References Cited

U.S. PATENT DOCUMENTS 3,329,632 A * 7/1967 Bryner .................. C09J 161/06
524/15
6,337,302 B1 * 1/2002 Teng ..................... C01B 32/336
423/445 R
(Continued)

FOREIGN PATENT DOCUMENTS

CA 2722011 5/2011
CN 103865440 A * 6/2014
(Continued)

OTHER PUBLICATIONS

B. E Morgan & G. K. Dumbauld, "Use of Activated Charcoal in Cement to Combat Effects of Contamination by Drilling Muds," 195 Petroleum Transactions, AIME 225 (1952).*
(Continued)

*Primary Examiner* — Liam J Heincer
(74) *Attorney, Agent, or Firm* — McMillan LLP

(57) ABSTRACT

The present invention relates to lignin compositions and methods for producing lignin composite materials. Composites of this invention substantially reduce or eliminate odor emanating from lignin that would otherwise be present.

13 Claims, 2 Drawing Sheets

Related U.S. Application Data filed on Mar. 31, 2016, provisional application No. 62/315,731, filed on Mar. 31, 2016, provisional application No. 62/315,737, filed on Mar. 31, 2016.

(51) Int. Cl.

| | | |
|---|---|---|
| *B29B 9/10* | (2006.01) | |
| *B29C 43/00* | (2006.01) | |
| *B29C 45/00* | (2006.01) | |
| *B29C 48/00* | (2019.01) | |
| *B29C 70/58* | (2006.01) | |
| *B29K 1/00* | (2006.01) | |
| *B29K 101/12* | (2006.01) | |
| *C08J 3/22* | (2006.01) | |
| *C08K 3/04* | (2006.01) | |
| *C08K 3/34* | (2006.01) | |
| *C08K 3/40* | (2006.01) | |
| *C08L 23/06* | (2006.01) | |
| *C08L 23/08* | (2006.01) | |
| *C08L 23/12* | (2006.01) | |
| *C08L 61/06* | (2006.01) | |
| *C08L 97/00* | (2006.01) | |
| *C08L 97/02* | (2006.01) | |
| *C08L 101/00* | (2006.01) | |
| *B29K 105/16* | (2006.01) | |

(52) U.S. Cl.
CPC ........ *B29C 45/0001* (2013.01); *B29C 48/022* (2019.02); *B29C 70/58* (2013.01); *C08J 3/226* (2013.01); *C08K 3/04* (2013.01); *C08L 23/06* (2013.01); *C08L 23/0815* (2013.01); *C08L 23/12* (2013.01); *C08L 61/06* (2013.01); *C08L 97/005* (2013.01); *C08L 97/02* (2013.01); *C08L 101/00* (2013.01); *B29K 2001/00* (2013.01); *B29K 2101/12* (2013.01); *B29K 2105/16* (2013.01); *B29K 2995/0093* (2013.01); *C08J 2323/06* (2013.01); *C08J 2497/00* (2013.01); *C08K 3/34* (2013.01); *C08K 3/40* (2013.01); *C08L 2201/08* (2013.01); *C08L 2205/16* (2013.01); *C08L 2207/062* (2013.01); *C08L 2207/064* (2013.01); *C08L 2310/00* (2013.01)

(56) References Cited

U.S. PATENT DOCUMENTS

| | | | |
|---|---|---|---|
| 10,399,244 B2 * | 9/2019 | Li | B27N 1/003 |
| 2002/0084045 A1 * | 7/2002 | Collias | D21H 17/23 |
| | | | 162/16 |
| 2004/0101695 A1 * | 5/2004 | Abe | A61L 9/01 |
| | | | 428/454 |
| 2004/0244925 A1 * | 12/2004 | Tarasenko | D21C 1/04 |
| | | | 162/16 |
| 2012/0237989 A1 * | 9/2012 | Retsina | D21C 3/06 |
| | | | 435/136 |
| 2014/0171739 A1 | 6/2014 | Jansen et al. | |
| 2015/0259369 A1 * | 9/2015 | Mckellar | C07G 1/00 |
| | | | 530/502 |

FOREIGN PATENT DOCUMENTS

| | | | | |
|---|---|---|---|---|
| GB | 1057693 A | * | 2/1967 | ............ C09J 161/06 |
| JP | 2004148046 A | * | 5/2004 | ................ A61K 8/66 |
| KR | 100702622 B1 | * | 3/2007 | .......... C08F 283/124 |
| NO | WO2015054736 | | 4/2015 | |
| WO | WO-2012106808 A1 | * | 8/2012 | ............. C08L 97/02 |
| WO | WO-2015104459 A1 | * | 7/2015 | ............ C08L 97/005 |

OTHER PUBLICATIONS

English-language machine translation for KR-100702622-B1, conducted on Espacenet on Mar. 11, 2020.*

English-language machine translation for CN-103865440-A, conducted on Espacenet on Mar. 11, 2020.*

Ferhan Cecen, "Activated Carbon," in Kirk-Othmer Encyclopedia of Chemical Technology, 34 pages, published online 2014.*

Harry Marsh & Francisco Rodriguez-Reinoso, Activated Carbon, "Chapter 8 Applicability of Activated Carbon" 383-453 (2006).*

* cited by examiner

LIGNIN COMPOSITES COMPRISING ACTIVATED CARBON FOR ODOR REDUCTION

This application claims the benefit of U.S. Provisional Application No. 62/315,731 filed on Mar. 31, 2016, and U.S. Provisional Application No. 62/315,722 filed on Mar. 31, 2016, and U.S. Provisional Application No. 62/315,737 filed on Mar. 31, 2016, and U.S. Provisional Application No. 62/315,744 filed on Mar. 31, 2016, the contents of each of which are incorporated herein by reference.

TECHNICAL FIELD

The present relates generally to composites that include lignin and more specifically to the use of odor reducing compounds such as activated carbon to reduce the odor of lignin and composite materials such as adhesives and formulations incorporating lignin.

BACKGROUND ART

Lignin is a constituent of the cell walls of almost all dry land plants. It is the second most abundant natural polymer in the world, surpassed only by cellulose, and is the only large-scale biomass source of aromatic functionality. Lignin can be isolated from various sources using different extraction methods, resulting in various types of lignin having different characteristics.

Large quantities of lignin are generated worldwide from pulping processes. Much of this lignin is not isolated, but is burned on site to provide steam for heat and power production. However, a large number of materials and products can be made from lignin. For example, lignin is already used in the formulation of dispersants, binders, adhesives and surfactants, with some of the processes used in the polymerization of these materials taking place at higher than ambient temperatures, further increasing the liberation of odors and volatiles. Lignin is of increasing interest as an alternative material that can be used more widely to replace fossil-derived materials, such as aromatic petrochemicals.

Depending on its source, lignin can have a strong pulp mill odor, and this often strong, unpleasant odor has been a major limitation to its adoption as an alternative "green chemical". One of the application areas for use of lignin has been as a replacement for petrochemical based phenol formaldehyde (PF) resins, but again one drawback has been the noxious odor associated with the lignin. The production of many value added chemicals from lignin may be realized if higher quality, odor-free lignin can be obtained.

Much effort has been focused on reducing lignin odor by adjusting the process parameters during its manufacture or isolation. Lengthy purification steps and/or the addition of oxidizing agents during processing can be used to assist with odor reduction. For example, an oxidation step may be used to reduce or eliminate odor for lignin having high value end-use applications. In some cases pressurized black liquor is reacted with an oxidizing agent (such as oxygen, ozone or hydrogen peroxide) in an amount sufficient to reduce or eliminate the odor level in the black liquor so that there will be little or no odor in the final lignin product. Ideally only the malodorous materials, such as mercaptans, are oxidized; not the lignin material itself.

Other approaches to dealing with the odor have included reducing the amount of lignin being used in the particular end-use application, or simply limiting human exposure to the smell. While the above noted methods may have applicability in particular applications, improvements in methods used to reduce odor in lignin compositions are desired.

SUMMARY OF INVENTION

According to an aspect of the invention, there is provided a method of treating lignin that includes mixing the lignin with an odor reducing compound to form a mixture. The compound may be activated carbon, and comprises 1% to 5% of total dry weight of the mixture.

According to another aspect of the invention, there is provided a lignin composition that includes lignin and activated carbon. The proportion of activated carbon in the composition is in the range of 1% to 5% of the dry weight of the lignin composition.

According to yet another aspect of the invention, there is provided a method of treating lignin to selectively reduce odor. The method includes blending the lignin with activated carbon, to obtain a mixture comprising activated carbon in a range of 1% to 5% of total dry weight of the mixture. Increasing the proportion of activated carbon in the mixture within the range, reduces the odor of the mixture further.

In one aspect of the technology described herein, methods to reduce or eliminate odors in lignin materials are provided. A further aspect of the technology described herein is to provide lignin compositions produced by these methods, the compositions including lignin together with activated carbon or similar odor control chemicals, and also articles and composite products that incorporate such treated lignin compositions. Further, embodiments of the odor-reducing methods are naturally derived and use non hazardous components.

Embodiments of the odor-reducing treatment methods and resulting compositions described herein can provide lignin compositions that are substantially free from odors originating from components incorporated or generated during the extraction or isolation of the lignin.

A method of preparing a substantially odor-free lignin material from a malodorous lignin material includes mixing the malodorous lignin material with activated carbon or similar compound. In some embodiments of the method the weight percentage of activated carbon that is mixed with the lignin material is in the range of about 1% to 5%, and in some embodiments it is in the range of about 1% to 2% (based on the total dry weight).

An improved lignin composition comprises a particulate lignin material having particles of activated carbon mixed or similar, distributed therein. In some embodiments, the dry weight percentage of activated carbon in the lignin/activated carbon mixtures is in the range of about 1% to 5%, and in some embodiments it is in the range of about 1% to 2% (based on the total dry weight). In some embodiments the lignin/activated carbon mixture has a moisture content of up to about 60%. In some embodiments the moisture content is in the range of about 20% to about 50%.

BRIEF DESCRIPTION OF DRAWINGS

In the figures which illustrate by way of example only, embodiments of the present invention.

DESCRIPTION OF EMBODIMENTS

Figure 1:
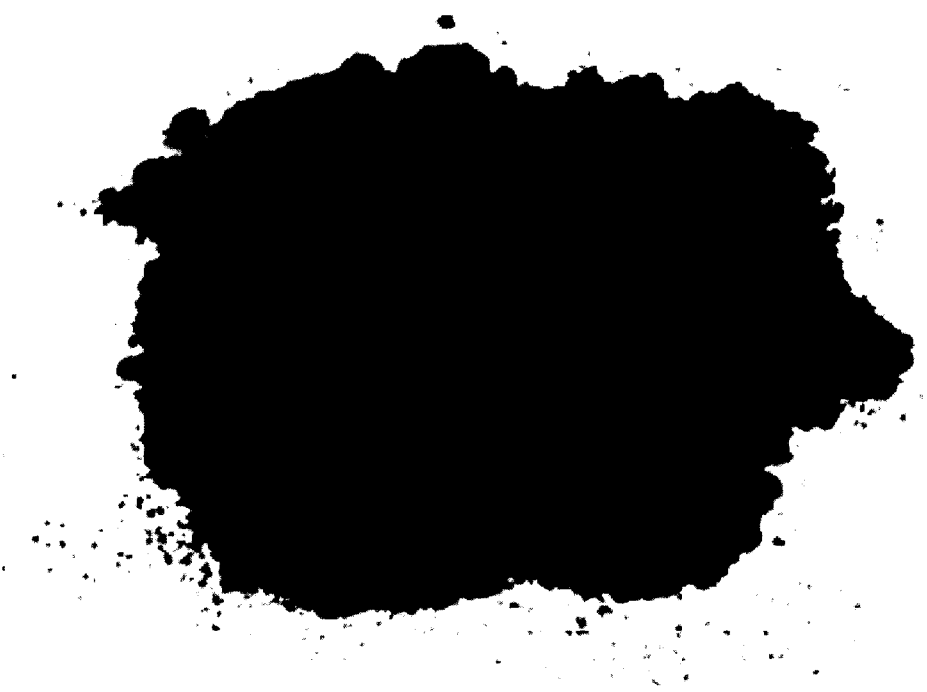
FIG. 1 is a color photograph showing a sample of lignin.

The most common form of lignin is as a loose, amorphous powder that is usually beige or light brown in color. FIG. 1 is a color photograph showing a typical sample of lignin.

The unpleasant odor of lignin powder can be significantly reduced or eliminated by addition of activated carbon which is also commonly known as activated charcoal. Activated carbon is widely used to adsorb odorous or colored substances from gases or liquids, but not usually from solids, such as solid particulate materials.

Mixing lignin powder with a small proportion of activated carbon at ambient temperatures provides substantial reduction or elimination of the odor. The odor-reducing effect is substantially immediate.

Figure 2:
FIG. 2 is a color photograph showing a sample of lignin mixed with activated carbon.

FIG. 2 is a color photograph showing a sample of lignin mixed with about 2% by weight activated carbon, based on the dry weight of lignin. The color of the material is just slightly darker or greyer than the untreated lignin sample shown in FIG. 1.

The treatment process is simple and does not require the application of heat, pressure, or the use of water, organic solvents or harsh reagents. It does not generate a wastestream or by-products, nor does it involve costly, complex or time-consuming processing steps or expensive equipment.

It seems that the activated carbon reacts with, or physically adsorbs, malodorous species that are often present in lignin materials, providing a thermally stable interaction (e.g. a physical or chemical bond) with the odor-causing species, thus reducing or eliminating the emission of odor.

Sufficient amounts of activated carbon can be incorporated so that a desirable degree of odor reduction or odor elimination is achieved. The amount of activated carbon generally required for providing substantially odor-free lignin has been found to be in the range of about 1% to 5%, and preferably about 1% to 2% by weight of the dry weight of the lignin. Generally no additional improvement is observed when higher levels of activated carbon are utilized.

In some embodiments, activated carbon with iodine numbers in the range of 400 to 3000 or more can be used. In some embodiments activated carbon with iodine numbers in the range of 400 to 800 can be used. For example, in one embodiment, malodorous powdered lignin samples having an approximate average particle size of 90 microns were blended with 2% by weight of 600 iodine number activated carbon to yield a substantially odor-free material.

Figure 3:
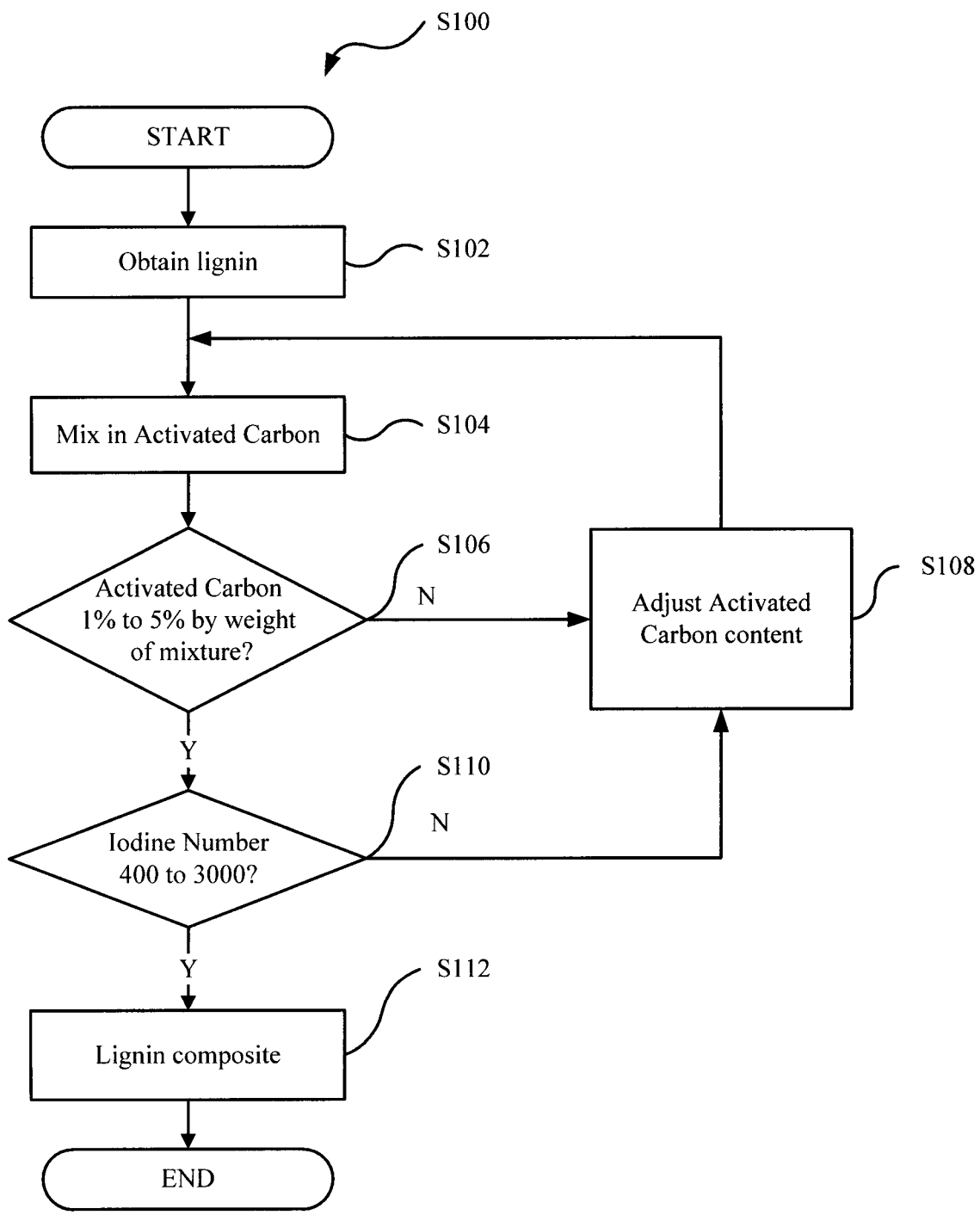
FIG. 3 is a flowchart of a process exemplary of an embodiment of the present invention.

FIG. 3 depicts a flowchart that depicts schematically the process steps in one exemplary embodiment. As shown, the process S100 starts with obtaining lignin (S102), and adding an activated carbon (S104), if the activated carbon is 1% to 5% by weight of mixture the process continues to step S110. Otherwise the activated carbon content is adjusted (S108) and the process returns to step S104. The process then determines if the iodine numbers are in the range of 400 to 3000 (S110) and if so the lignin composite is produced in S112 and the process terminates. Otherwise the process returns to step S108 to further adjust the activated carbon so as to satisfy the requirements in steps S106 and step S110.

Laboratory samples of up to about 15 kg have been prepared with 1% and 2% by weight additions of activated carbon. In a qualitative assessment, two industry experts commented that these were the lowest odor lignin materials they had encountered in 40 years.

Mixing can be achieved by addition of activated carbon or similar odor reducing compound during the lignin manufacturing or extraction process, or during the packaging process. Activated carbon can be added quantitatively by blending in varying proportions from 1% to about 5%, based on the dry weight of lignin, using a prescribed method of dry addition from a conveyor.

For most end-use applications it is not necessary to separate the treated lignin from the activated carbon. In other words, for most end-use applications, a lignin composition comprising a small proportion of activated carbon can be used in substantially the same way as untreated lignin. If it is desired to separate the lignin from the activated carbon, post-treatment, the lignin can be dissolved in a suitable solvent, the solution separated from the activated carbon by filtration or another suitable method. The lignin can then be precipitated from solution or the solvent can be removed to yield lignin powder.

Higher weight percentages of activated carbon can be used, for example, if the lignin has a particularly strong and noxious odor and/or if the presence of the activated carbon does not have a detrimental effect in the intended end-use application of the lignin.

It is believed that activated carbons derived from a wide variety of sources (including, but not limited to, coconut husks, wood, peat and even lignin) and activated by various oxidative processes to yield polar functionalities on the carbon surface will be effective for use as described herein.

The above-described method for lignin odor reduction or elimination is a simple, inexpensive process that uses small proportions of activated carbon, which is readily available at reasonable cost.

The resulting lignin compositions have no odor or only a slight odor, and can therefore command a premium price relative to untreated lignin material. Odorless lignin is more likely to be accepted or adopted as substitute for fossil-based chemicals and for conversion into other value-added products.

For end-use applications involving heating of a material comprising lignin, using an odorless lignin material will be especially beneficial, as often the heating process intensifies the odor.

Lignin has many potential applications, and in many of these applications it can be used to replace some or all of the petrochemical-based aromatic compounds that are conventionally used. For example, it can be used as a substitute material in various phenol formaldehyde (PF) resin applications, such as: adhesive binders in plywood; binders in foundry sands; surfactants; polyols; polyurethanes; and in plastics in combination with polypropylene and polyethylene. Lignin compositions containing activated carbon may be used to replace some or all of the phenol formaldehyde resin used in these applications.

Thus, in some aspects, some embodiments of the present invention may involve incorporating lignin and activated carbon into an adhesive binder for wood panels such as plywood, oriented strand board (OSB), laminated veneer lumber (LVL), medium density fiberboard (MDF) and the like. The adhesive binder includes lignin and activated carbon and phenol formaldehyde resins.

Casting operations at foundries often produce odor-causing compounds, and odors generated by foundries in populated areas often result in complaints. The majority of the phenolic resins used to bind the sand generate odors during core making, core curing and/or metal casting processes.

In some aspects the present technology comprises using lignin-activated carbon mixtures as binders for foundry sands to fully or partially replace conventional binders and resins used in this application.

To summarize, the technology described herein relates to methods to reduce or eliminate odors in lignin material. The methods comprise mixing activated carbon with the lignin material in an amount effective to reduce or eliminate odors in the treated materials. It has been discovered that activated carbon is useful for reduction or elimination of odors in finished products that incorporate the treated lignin, such as resin-wood composites. The odor reduction mechanism involves odor elimination, rather than odor masking.

In an exemplary of embodiment of the present invention, a sample of lignin was treated with different amounts of activated carbon, and treated and untreated samples were subject to a qualitative assessment of their odor. Sample 1A was untreated (no activated carbon added). Sample 1B was mixed with 0.5% by weight of activated carbon. Sample 1C was mixed with 2% by weight of activated carbon. Each of the 3 samples was placed in an air-tight jar. A human panel of seven testers evaluated the odor of each of the three samples by removing the lid of the jars, smelling the sample and rating the odor on a standardized 3-point scale (1—representing the least odor to 3 representing a strong, unpleasant odor). The results are shown in Table 1 below. Sample 1B exhibited a reduced odor compared to untreated Sample 1A, and Sample 1C which contained the highest amount of activated carbon exhibited a reduced odor compared to Samples 1 A and 1B. As may be noted in Table 1, raising the proportion of active carbon from 0.5% to 2%, reduces the odor of the mixture from about 1.6 to about 1.1 a this standardized scale—a reduction of about 31%.

TABLE 1

|  | Sample 1A (0% AC) | Sample 1B (0.5% AC) | Sample 1C (2% AC) |
| --- | --- | --- | --- |
| Tester 1 | 3 | 1 | 2 |
| Tester 2 | 2 | 1 | 1 |
| Tester 3 | 2 | 1 | I |
| Tester 4 | 2 | 2 | 1 |
| Tester 5 | 2 | 2 | 1 |
| Tester 6 | 3 | 2 | 1 |
| Tester 7 | 1 | 2 | 1 |
| Average odor rating | 2.1 | 1.6 | 1.1 |

While particular elements, embodiments and applications of the present invention have been shown and described, it will be understood, that the invention is not limited thereto since modifications can be made by those skilled in the art without departing from the scope of the present disclosure, particularly in light of the foregoing teachings.

The disclosures of all patents, patent applications, publications and referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art. Such modifications as would be apparent to one skilled in the art are intended to be included within the scope of the following claims.

What is claimed is:

1. A lignin composition consisting of dry solid lignin and activated carbon,
    wherein the proportion of the activated carbon in the composition is in the range of 1% to 5% of the dry weight of the lignin composition; the activated carbon is dry; and the activated carbon absorbs odor from the dry solid lignin, wherein the lignin composition is a powder suitable for use as a substitute for untreated lignin, wherein the activated carbon has an iodine number in the range of about 400 to about 3000.

2. The lignin composition of claim 1, wherein the activated carbon is blended with the dry solid lignin so that the activated carbon is thoroughly dispersed within the lignin composition.

3. The lignin composition of claim 1, wherein the activated carbon is derived from natural non-petrochemical sources.

4. The lignin composition of claim 1, wherein the sources of the lignin comprise at least one of: coconut husks, wood, peat and lignin.

5. The lignin composition of claim 1, wherein the proportion of activated carbon in the composition is in the range of 1% to 2% of the dry weight of the lignin composition.

6. The lignin composition of claim 1, wherein the moisture content of the lignin is less than 60% by weight.

7. The lignin composition of claim 1, wherein carbon in the activated carbon is derived from at least one of: coconut husks, wood, peat and lignin, and the carbon is activated by an oxidative process.

8. An article comprising the lignin composition of claim 1.

9. An adhesive binder comprising the lignin composition of claim 1.

10. A composite wood panel comprising the adhesive binder of claim 9, wherein the wood panel is one of: plywood, oriented strand board (OSB), laminated veneer lumber (LVL) and medium density fiberboard (MDF).

11. The composite wood panel of claim 10, wherein the adhesive binder further comprises phenol formaldehyde resin.

12. A lignin composition consisting of dry solid lignin and activated carbon wherein the proportion of the activated carbon is in the range of 1% to 5% of the dry weight of the lignin composition wherein the lignin composition is suitable for use as a substitute for untreated lignin wherein the activated carbon has an iodine number in the range of about 400 to about 3000.

13. The lignin composition of claim 12, wherein the activated carbon absorbs odor from the dry solid lignin.

* * * * *